United States Patent
Foreman et al.

(10) Patent No.: US 9,959,382 B2
(45) Date of Patent: May 1, 2018

(54) ADAPTIVE CHARACTERIZATION AND INSTANTIATION OF TIMING ABSTRACTS

(71) Applicant: International Business Machines Corporation, Armonk, NY (US)

(72) Inventors: Eric A. Foreman, Fairfax, VT (US); Jeffrey G. Hemmett, St. George, VT (US); Kerim Kalafala, Rhinebeck, NY (US); Dileep N. Netrabile, Apex, NC (US); Stephen G. Shuma, Underhill, VT (US); Natesan Venkateswaran, Hopewell Junction, NY (US); Vladimir Zolotov, Putnam Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 41 days.

(21) Appl. No.: 14/986,842

(22) Filed: Jan. 4, 2016

(65) Prior Publication Data

US 2017/0193151 A1    Jul. 6, 2017

(51) Int. Cl.
G06F 17/00    (2006.01)
G06F 17/50    (2006.01)

(52) U.S. Cl.
CPC ...... *G06F 17/5081* (2013.01); *G06F 17/5031* (2013.01); *G06F 2217/78* (2013.01); *G06F 2217/84* (2013.01)

(58) Field of Classification Search
USPC ........................................................ 716/113
See application file for complete search history.

(56) References Cited

U.S. PATENT DOCUMENTS

| | | | |
|---|---|---|---|
| 6,516,453 B1 | 2/2003 | Knapp | |
| 7,937,256 B2 | 5/2011 | Tseng et al. | |
| 8,010,921 B2 | 8/2011 | Visweswariah | |
| 8,024,697 B2 | 9/2011 | Hamilton et al. | |
| 8,122,404 B2 | 2/2012 | Sinha et al. | |

(Continued)

FOREIGN PATENT DOCUMENTS

EP    1179790 A1    2/2002

OTHER PUBLICATIONS

Blaauw et al., "Statistical Timing Analysis: From Basic Principles to State of the Art", IEEE Transactions on Computer-Aided Design of Integrated Circuits and Systems, vol. 27, No. 4, Apr. 2008, pp. 589-607.

(Continued)

*Primary Examiner* — Mohammed Alam
(74) *Attorney, Agent, or Firm* — Cantor Colburn LLP

(57) ABSTRACT

A method, system, and computer program product to characterize and adaptively instantiate timing abstracts to perform timing analysis of an integrated circuit include generating an adaptable timing abstract for one or more macro models of a macro, the macro including two or more primitives of a component of the integrated circuit, the adaptable timing abstract being a parameterized timing model with at least one aspect represented by two or more models, and estimating requirements for the timing analysis, the requirements including accuracy, runtime, or memory requirements. Selecting a specific timing abstract, obtained by setting parameters of the adaptable timing abstract, is to perform the timing analysis based on the requirements.

14 Claims, 7 Drawing Sheets

(56) References Cited

U.S. PATENT DOCUMENTS

| | | |
|---|---|---|
| 8,141,025 B2 | 3/2012 | Sinha et al. |
| 8,239,798 B1 | 8/2012 | Goyal et al. |
| 8,683,409 B2 | 3/2014 | Hemmett et al. |
| 2005/0091555 A1* | 4/2005 | Xiao .................. G06F 17/5031 713/500 |
| 2006/0059446 A1 | 3/2006 | Chen et al. |
| 2010/0211922 A1* | 8/2010 | Sinha .................. G06F 17/5031 716/108 |
| 2012/0246606 A1* | 9/2012 | Krauch ............... G06F 17/5031 716/113 |
| 2014/0096100 A1* | 4/2014 | Sinha .................. G06F 17/5036 716/113 |

OTHER PUBLICATIONS

Feng et al., "A Methodology for Timing Model Characterization for Statistical Static Timing Analysis", IEEE, 2007, pp. 725-729.
Goel et al., "Statistical Waveform and Current Source Based Standard Cell Models for Accurate Timing Analysis", DAC, Jun. 8-13, 2008, pp. 227-230.
Venkatesan et al., "MACACO: Modeling and Analysis of Circuits for Approximate Computing", IEEE, 2011, pp. 667-673.
Zolotov et al., "Compact Modeling of Variational Waveforms", International Conference on Computer-Aided Design, 2007, pp. 705-712.

* cited by examiner $a_1 + a_1X_1 + a_2X_2 + a_3X_3 + a_{1,2}X_1X_2 + a_{1,3}X_1X_3 + a_{1,2}X_{21}X_3 + \cdots$ ← 310

$\Downarrow$ $[a_1 + \epsilon(a_1X_1) + \epsilon(a_{1,2}X_1X_2) + \epsilon(a_{1,2}X_1X_3)] + a_2X_2 + a_3X_3 + a_{1,2}X_{21}X_3 + \cdots$ ← 320 where  $\epsilon$ = error
$\epsilon(a_1X_1) = a_1 max(X_1)$
$\epsilon(a_{1,2}X_1X_2) = a_{1,2}max(X_1)max(X_2)$
$\epsilon(a_{1,3}X_1X_3) = a_{1,3}max(X_1)max(X_3)$

FIG. 3

ADAPTIVE CHARACTERIZATION AND INSTANTIATION OF TIMING ABSTRACTS

BACKGROUND

The present invention relates to timing analysis in integrated circuit design, and more specifically, to adaptive characterization and instantiation of timing abstracts.

Timing analysis is an important part of integrated circuit (chip) design and helps to ensure that the physical implementation of the chip design meets all timing constraints. The timing analysis may be performed at different levels of accuracy. Generally, for a given circuit, the accuracy, run time, and memory usage associated with timing analysis depend on the complexity of the model used to represent the variables involved in the timing analysis. Models that provide greater accuracy require more memory and longer run times. Thus, improving accuracy is at the cost of higher memory usage and longer run time.

SUMMARY

Embodiments include a method, system, and computer program product for characterizing and adaptively instantiating timing abstracts to perform timing analysis of an integrated circuit. Aspects include generating an adaptable timing abstract for one or more macro models of a macro, the macro including two or more primitives of a component of the integrated circuit, the adaptable timing abstract being a parameterized timing model with at least one aspect represented by two or more models; estimating requirements for the timing analysis, the requirements including accuracy, runtime, or memory requirements; and selecting a specific timing abstract obtained by setting parameters of the adaptable timing abstract to perform the timing analysis based on the requirements.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 shows representations of timing quantities with different levels of accuracy according to embodiments;

DETAILED DESCRIPTION

As noted above, there is a tradeoff in timing analysis between improved accuracy and higher memory usage and longer run times. Previous ways of addressing the tradeoff include controlling accuracy by sensitivity filtering and performing partially deterministic and partially statistical timing. These previous techniques tend to be more conservative than necessary. This is because they fail to take into account that different parts of the chip design require different levels of accuracy in timing analysis. That is, only the more critical, higher frequency circuits may warrant the cost of higher accuracy timing analysis. Different stages of chip design also have different accuracy requirements. That is, less accurate timing analysis may be more easily tolerated during earlier stages of chip design. Embodiments of the systems and methods detailed herein relate to adaptive characterization and instantiation of timing abstracts to facilitate timing analysis at a context dependent accuracy level. Specifically, as detailed below, parameterized or adaptable timing abstracts are generated for each macro (block) of the chip. According to a hierarchical architecture, a macro at one level may be part of a larger macro at a higher level. For each macro, a specific timing abstract is selected or instantiated from the adaptable timing abstract based on the accuracy (and/or run time or complexity) required by the context, phase of design, designer input, or other requirement.

Figure 1:
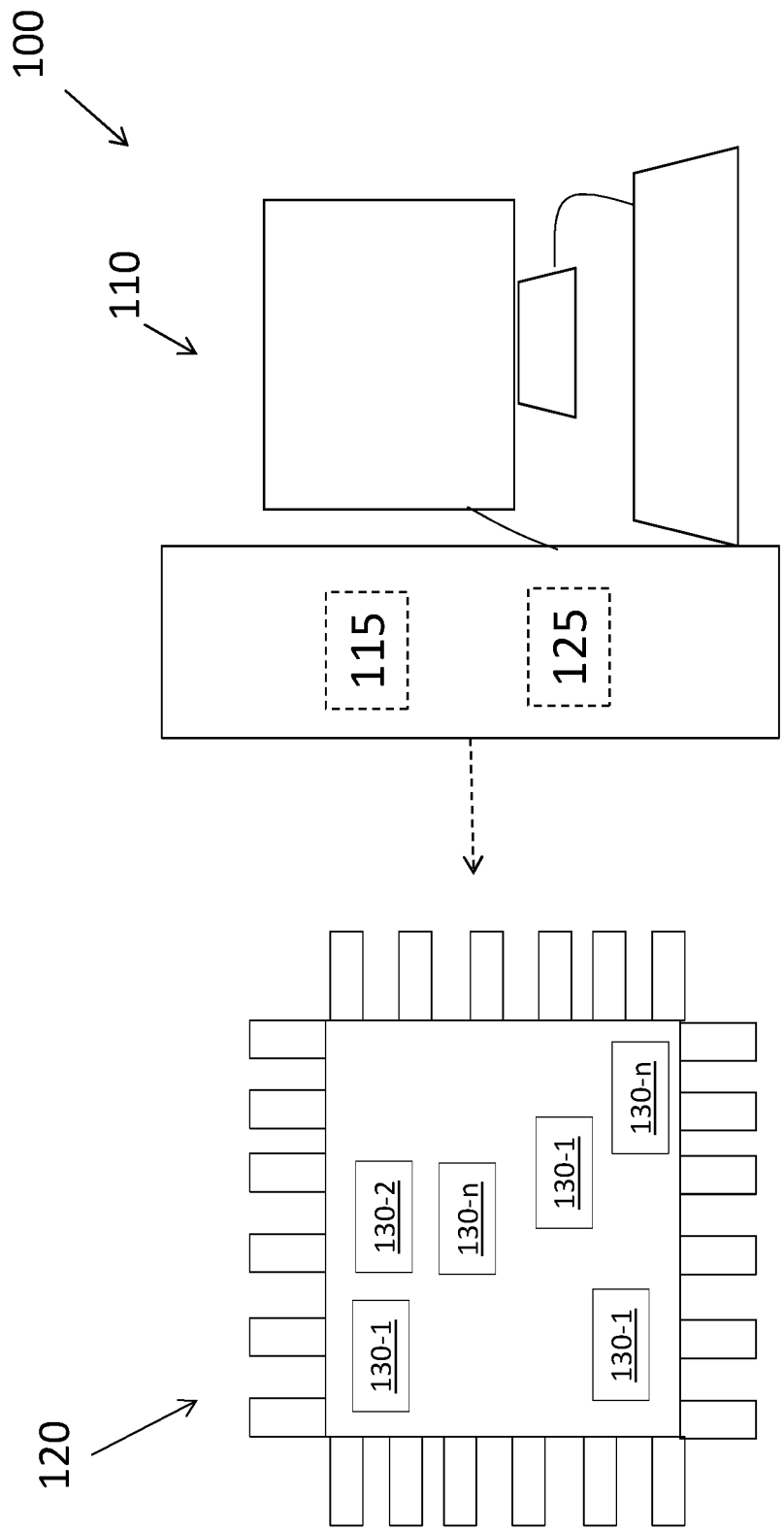
FIG. 1 is a block diagram of a system according to embodiments.

FIG. 1 is a block diagram of a system 100 according to embodiments of the invention. The system 100 includes a processing system 110 used to design an integrated circuit and the resulting physical implementation of the integrated circuit 120. The system 100 includes additional known components (e.g., input/output interface) that perform functions such as, for example, obtaining measurements from the integrated circuit 120 that are provided to the processing system 110 as needed. The processing system 110 includes one or more memory devices 115 and one or more processors 125. Multiple of the processors 125 may be used in the adaptive characterization and instantiation of timing abstracts in timing analysis, as detailed below. The memory device 115 stores instructions implemented by the processor 125. As further discussed below, these instructions include processes used to perform the timing analysis according to embodiments. According to the embodiments detailed below, the memory device 115 may additionally store timing abstracts. The integrated circuit 120 is shown with exemplary macros 130-1, 130-2, 130-n (referred to generally as 130) indicated. As FIG. 1 illustrates, the same circuit design or macro 130 may be used in different areas of the chip. That is, for example, multiplication may be performed at different places in the circuit design such that the macro 130-1 representing the primitives that perform the multiplication function are shown in three different parts of the exemplary integrated circuit 120. The exemplary macro 130-n is also shown more than once for the exemplary integrated circuit 120. Depending on the context of the timing analysis (e.g., stage of chip design, particular location of the macro 130), every macro 130-1 need not be associated with the same accuracy of timing abstract. This context-specific selection of timing abstract for each instance of each macro is further discussed below.

Timing analysis is known and is only briefly summarized here. Timing analysis refers to determining the time it takes to go from the input to the output of each component of an integrated circuit (e.g., each circuit cell and interconnect wire connecting circuit cells) and, thus, aggregately, from the input to the output of the integrated circuit 120. Any number of components of the integrated circuit 120 may be regarded as a macro 130. That is, at the lowest hierarchical level, a circuit cell may be regarded as a macro 130, while all the components disposed in half of the integrated circuit may be regarded as a macro 130 at a higher hierarchical level. For practical purposes, the higher the number of components in a macro 130, the more abstracted the timing model of the macro 120 may be. That is, the macro 130 is some portion of the circuit modeled with its timing modeled as a timing abstraction in a hierarchical method of timing analysis.

The time determined through timing analysis may be compared with the timing requirements imposed on the design to determine areas of the integrated circuit 120 with positive timing slack and those that do not meet timing constraints. The time through each macro 130 is determined by propagating the arrival time of a voltage signal at an input of the macro 130. Specifically, the arrival time at the input node of any logic gate or other library cell, interconnect wire, or timing abstract (which represents timing for underlying components) is used to determine arrival time at the output node of that gate, library cell, interconnect wire, or timing abstract by adding the arrival time at the input with delay required for the signal to propagate from the input to the output. At the output node of the gate, library cell, interconnect wire, or timing abstract, the arrival time is computed as the worst arrival time among all signals propagated to that output. For early mode timing analysis, the worst arrival time means the earliest possible arrival time. For the late mode timing analysis, the worst arrival time means the latest possible arrival time. In the simplest case of deterministic timing analysis, the arrival time, delay, or any other timing quantity is a single number rather than a range. For statistical timing analysis, the arrival time, delay, or any other timing quantity can be modeled with functions or probability distributions expressing its dependence on variational parameters affecting timing behavior of the circuit. The output node of a gate, library cell, or timing abstract is the input node of the interconnect wire. The output node of the interconnect is the input node of another logic gate, library cell, or timing abstract. To be clear, a given macro 130 may involve more than one input node, as further discussed below (i.e., there may be more than one path through a macro 130). The arrival time at any node is understood as the time at which the voltage or current at the node reaches a certain level (e.g., half of the supply voltage value). The voltage waveform that indicates how quickly or slowly half the maximum voltage value (arrival time) is reached is represented by slew (duration from 10% to 90% voltage value, for example). Because the propagation delays through logic gates, library cells, and timing abstracts depend on the input slews or even on the whole (voltage) signal waveforms, the timing analysis usually involves computation of both signal delays and slews or even detailed signal waveforms.

The accuracy of timing analysis is affected by all the factors that affect how accurately arrival time may be estimated. Thus, accuracy of timing analysis is affected by, for example, the way a signal waveform is modeled (e.g., step, linear or non-linear ramp, piece-wise linear approximation, spline), models for computing signal delay and output signal slew, modeling waveforms as a function of input signal slew, or waveform, load capacitance, or other load models (e.g., Pi-model or, reduced order model), and models of variability.

Timing variability occurs due to the dependence of parameters of the transistors and interconnects of the integrated circuit 120 on process (manufacturing-related) variation and environmental parameters. Thus, one of the factors that affects accuracy of timing analysis is the number and variety of corners considered. A corner is a specific set of process (e.g., thickness or width of the wire or dielectric, voltage threshold or saturation current of complementary metal-oxide semiconductor (CMOS) transistors, transistor oxide thickness) and environmental (e.g., supply voltage, temperature) variables. The variability in timing can be modeled considering individual variational corners for multiple corners (multi-corner timing analysis). The arrival time at each node may be represented by two values—the early mode arrival time and the late mode arrival time—to account for the earliest and latest arrival time according to a set of corners. Variability in timing can also be modeled using statistical timing analysis. Parameterized statistical timing analysis models variability by representing timing quantities (e.g., delays, slews, arrival times, required arrival times, timing slacks, guard times of timing tests) in parameterized form as functions of process and environmental variational parameters. Common parameterized representations are linear, bilinear, or quadratic canonical forms. Those parameterized representations include information about values of the modeled timing quantities at all variational corners. The value of the timing quantity in any variational corner can be computed by simple substitution of variational parameters into the corresponding parameterized representation. The accuracy of the parameterized representation is based on the parameters that are included in the form, the parameters that are modeled linearly or quadratically, and, in case of bilinear form, which interactions of variational parameters are modeled with cross-terms. Usually variations are modeled with Gaussian probability distributions. However, for higher accuracy, non-Gaussian effects can be modeled with more complex probability distribution functions, either using analytical or numerical models. The accuracy of numerical models is controlled with the number of points of discretization or with the order of approximation. Another factor that affects accuracy of timing analysis is the accuracy with which the voltage waveform is represented for any given corner. This is further discussed with reference to FIG. 2 below. The level of complexity of the macro model also affects accuracy of the timing analysis of the macro 130.

Timing abstracts, which are known, are briefly described, and adaptable timing abstracts according to embodiments are briefly introduced here. Timing abstract refers to a specific compact timing model used for a given circuit macro 130 (i.e., a collection of primitives that makes up a circuit). Timing abstracts are used in hierarchical timing analysis for modeling timing behavior of macros 130 instead of their detailed circuit level representations. The characterization (generation) of timing abstracts results from analyzing timing behavior of macros 130 and creating compact models of that behavior. Those compact models are generated with a certain level of approximation and the corresponding level of accuracy. The level of approximation defines not only the accuracy of the timing model but also its computational complexity, (i.e. memory and CPU run time required). Usually, timing abstracts are characterized (generated) before the timing analysis of the integrated circuit 120 containing the correspondent macros 130. The characterized timing abstracts may be organized into a library or database of the timing abstracts for use in analysis of the integrated circuit 120. The instantiation of timing abstracts is performed during construction of the timing model of the integrated circuit 120 to be analyzed, which usually occurs just before timing analysis. Because the integrated circuit 120 may have multiple levels of hierarchy, macros 130 of higher levels of hierarchy may include macros 130 of lower levels of hierarchy. Therefore, timing abstracts of lower levels of hierarchy may be used for generation of timing abstracts of higher levels of hierarchy. A special case of timing abstracts is timing models of logic gates, flip-flops, latches and other library cells. These are regarded as a special case because these components are not macros 130 by the generally understood meaning. Unlike macros 130, they are not composed of a collection of other components or library cells. These components, like macros 130, may have adaptable timing abstracts. Further, these components and their associated adaptable timing abstracts may be building blocks for macros 130 and their associated adaptable timing abstracts.

According to embodiments herein, an adaptable timing abstract is a generic parameterized timing model of a macro 130 from which different concrete timing abstracts with specific levels of approximation and corresponding accuracy may be derived. Adaptable timing abstracts are especially useful for statistical timing analysis because the statistical timing models are very complex, so they include many aspects of modeling (e.g., models of signal waveforms, statistical models of variability, models for computing signal delays and slews or waveforms as functions of input slews and loading circuits). Each aspect of the timing model may be represented in an adaptable timing abstract with a range of models. To be clear, not every aspect of the timing model may be parameterized in an adaptable timing abstract. Instead, only one or a subset of aspects may be parameterized while others are defined with a specific model. By setting parameters of an adaptable timing abstract, a proper combination of models for each aspect of timing modeling may be selected. The selection process can be as simple as selection of a linear ramp signal model or as complex as defining the number of points representing a signal waveform, or the order and parameters of a waveform model with splines or a polynomial model, or selecting of the order or reduced order modeling of interconnects, selecting what variations are modeled with linear or bilinear models or just with early-late split of mean values, for example.

As further discussed below, each adaptable timing abstract (of each macro 130) includes a generic specification of parameterized timing models, functions for deriving concrete timing abstract from that generic specification, and functions for evaluating accuracy of the derived timing model (specific timing abstract). The accuracy may be specified as a bound of maximum timing timer error and/or average expected timing error for each particular set of values of parameters defining the specific timing abstract. The characterization (generation) of an adaptable timing abstract refers to creating a generic timing model of a macro 130 from which timing abstracts of different levels of approximation and accuracy may be derived.

Adaptive instantiation with the required accuracy, further discussed below, refers deriving a specific concrete timing abstract from the adaptable timing abstract, taking into account the instantiation context and the current phase (stage) of circuit design (e.g., circuit synthesis, floor-planning, gate placement, global or local routing, engineering change order, timing closure). Designer input may also affect the timing abstract that is instantiated from the adaptable timing abstract. The derivation of the specific timing abstract from the adaptable timing abstract refers to selection of particular models for each aspect of the timing abstract and selection of parameters of those models to control their accuracy and level of approximation. For example, one aspect of the timing abstract is a signal waveform. The signal waveform may be modeled as step, linear ramp, piece-wise linear waveform, analytical function (polynomial, sine or cosine), or polynomial spline. The accuracy of the piece-wise approximation may be controlled with the number of linear segments, which is a parameter of that model defining the level of approximation and accuracy. Similarly the accuracy of spline model may be controlled with the number of its nodes, which is a parameter controlling approximation and accuracy. As another example, another aspect of the timing abstract is variability. Variability may be modeled simply, as different mean values of minimal and maximal signal delays, or as a more complex model of linear or bilinear canonical forms, which are characterized based on the number of process and environmental parameters included in the model, and based on which of them are modeled with linear, bilinear, or quadratic models. For bilinear models additional parameters specify interactions of which parameters are modeled with cross-terms. The accuracy of modeling special variations is controlled with the coarseness of the grid covering the chip area such that the accuracy of that model is parameterized with the size of the gird cell. The examples above show that adaptive instantiation is controlled both by the enumeration type of parameters defining the selection of particular models for different aspect of the timing abstract and by numerical integer and real (floating point) parameters defining accuracy and approximation level of the models.

Figure 2:
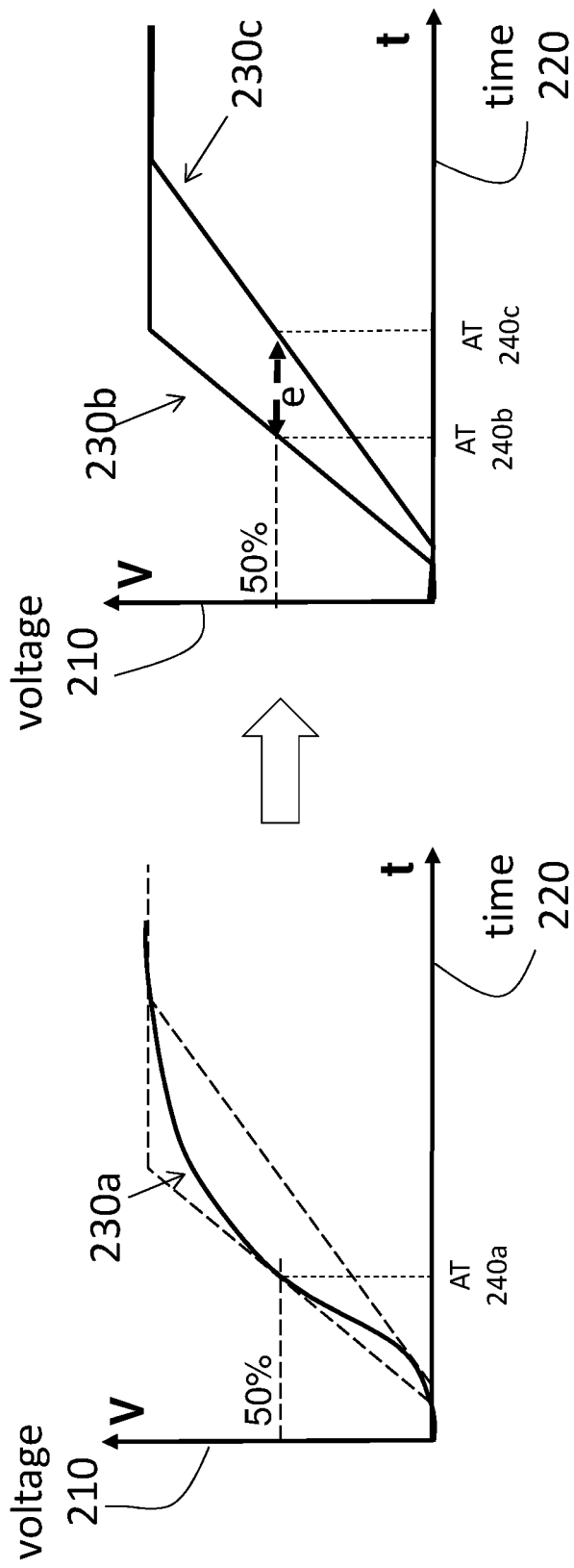
FIG. 2 illustrates different accuracy levels for voltage waveform representation according to embodiments.

FIG. 2 illustrates different accuracy levels for voltage waveform representation according to embodiments. Voltage 210 is plotted against time 220 to show a true voltage waveform 230$a$ and two approximate voltage waveforms 230$b$, 230$c$. The arrival time (AT) 240 associated with each waveform is also shown. The two approximate voltage waveforms 230$b$, 230$c$ are linear ramps that result from propagation of early and later arrival times, respectively, rather than true arrival time AT 240$a$ of voltage waveform 230$a$. Both approximations 230$b$, 230$c$ are linear ramps. In this case, the approximation 230$b$ resulting from the early arrival time is closer to the real arrival time AT 240$a$ than the approximation 230$c$. The approximation error is indicated by e. While determining and using the voltage waveform 230$a$ is more accurate, it also requires more memory and computation than using the approximations 230$b$, 230$c$. Another example of different levels of accuracy is shown in FIG. 3.

FIG. 3 shows representations of timing quantities with different levels of accuracy according to embodiments. Specifically, statistical parameterized representations are shown that may represent timing quantities such as signal delay, slew, arrival time, required arrival time, or timing slack in bilinear canonical form. These representations may be used to perform operations on timing quantities (e.g., summation of delay with arrival time, computation of latest arrival time among a set of arrival times). By using these representations, all process corners may be considered in a single timing run. The equation 310 is an example of linear parameterized approximation of arrival time, for example, which is written in canonical form as mean ($a_1$) and variance (represented by the other components of the equation). A simplified representation, which is the approximation of the canonical form with linear and cross-term sensitivities merged with the mean value, is given by equation 320. The timing quantity may be represented by additional levels of accuracy, as well.

Figure 4:
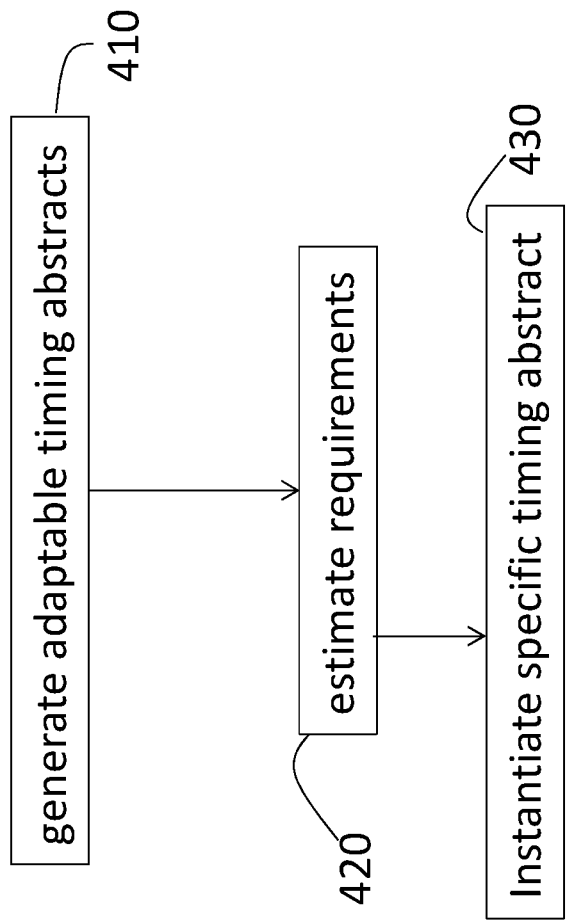
FIG. 4 is a process flow of a method of generating and instantiating adaptable timing abstracts according to embodiments.

FIG. 4 is a process flow of a method of generating and instantiating adaptable timing abstracts according to embodiments. The processes shown in FIG. 4 are general and are each detailed further below. At block 410, generating adaptable timing abstracts includes the processes further discussed with reference to FIG. 5. As outlined above, generating adaptable timing abstracts includes identifying two or more models for different aspects. The adaptable timing abstract may include parameterized models for one or more aspects of a timing model. A single parameterized model of an aspect of a timing model is a set of several potential models that may be used during instantiation of the timing abstract for modeling that aspect. Each of the models is an instance of the parameterized model where its parameters are set to certain values. For the example of the modeling aspect being a waveform, an exemplary parameterized model is a piece-wise linear representation of that waveform. Then the parameterized model represents a set of piece-wise linear models, which differ from each other based on the number of linear segments, and correspondingly with their accuracy and complexity. Identifying the particular piece-wise linear model for modeling the waveform (at block 430) is equivalent to identifying N individual models, because N is the number of possible numbers k1, k2, . . . kN of linear segments in the piece-wise linear model. On the other hand, for the exemplary aspect being a waveform, two non-parameterized models may be selected: a step function and a linear ramp function. Then during instantiation (block 430, described below) of a particular timing abstract, one of these models (step function or linear ramp function) may be selected. The models associated with each aspect of the adaptable timing abstract may involve different levels of complexity and provide different levels of accuracy. Adaptable timing abstracts are generated for each macro 130 at each hierarchical level of interest. Estimating requirements, at block 420, refers to estimating the requirements for accuracy or runtime or memory usage. Instantiating a specific timing abstract, at block 430, includes the processes further discussed with reference to FIG. 6. As outlined above, instantiating a specific timing abstract is done for each macro 130 and refers to selecting the models and associated parameters for each aspect of the adaptive timing abstract to match the requirements. As noted above, estimating the requirements (at block 420) and instantiating a specific timing abstract from the adaptable timing abstract for each macro 130 (at block 430) may be done iteratively at each stage of the integrated circuit 120 design. The requirements for accuracy may become more stringent as the design progresses, for example. As further discussed below, embodiments involve several levels of granularity in the selection of accuracy or runtime requirements.

Figure 5:
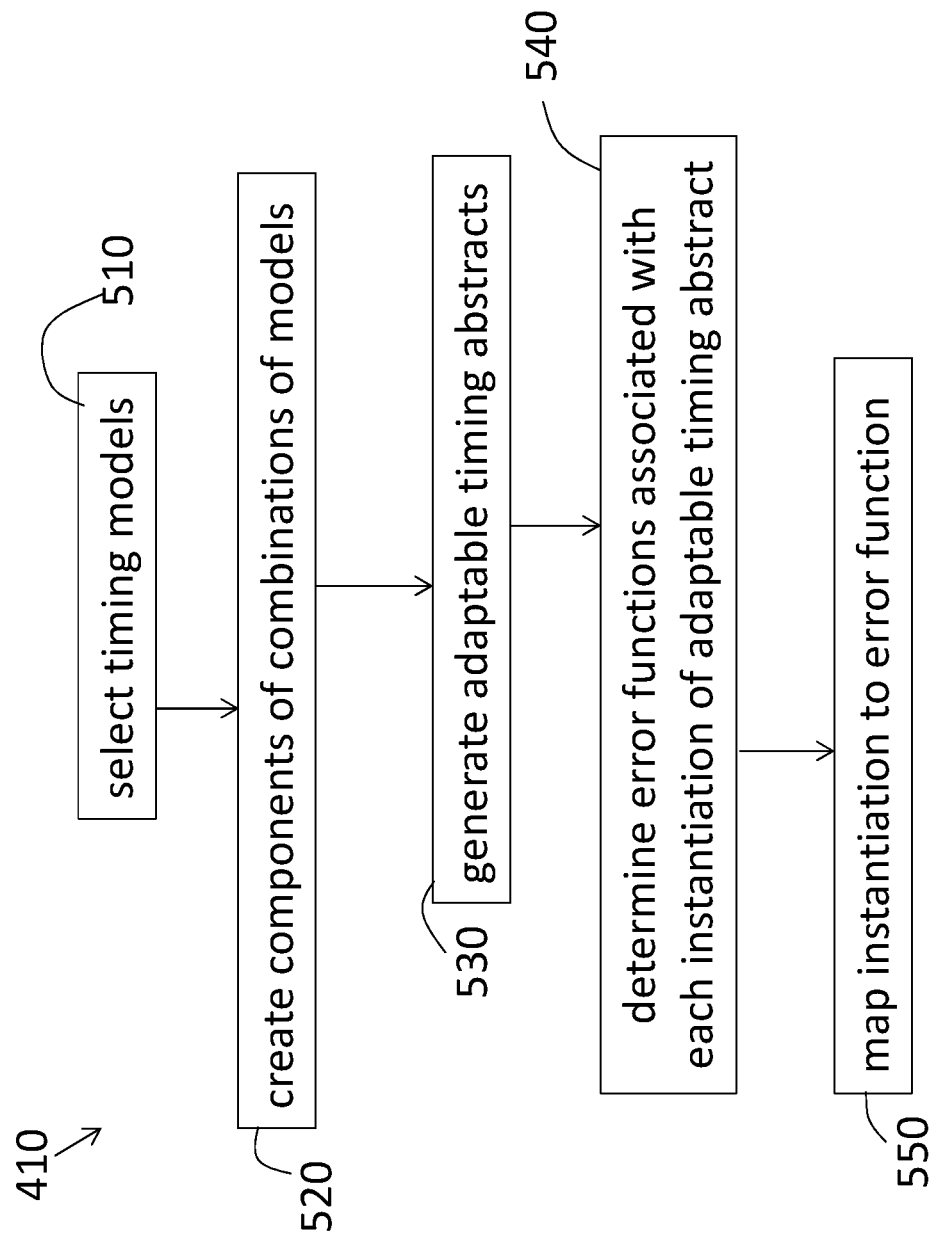
FIG. 5 is a process flow of a method of generating adaptable timing abstracts according to embodiments.

FIG. 5 is a process flow of a method of generating adaptable timing abstracts according to embodiments. The processes shown in FIG. 5 are included in the process at block 410 (FIG. 4). The processes are performed for each macro 130. Selecting timing models, at block 510, refers to selecting models for each aspect of the timing abstract. For at least one aspect, two or more models are selected. As noted above, a set of selected models may be represented with a single parameterized model. In that case, the number of allowable parameter values defines the number of potential models of the aspect that may be constructed from the parameterized model during instantiation. Exemplary aspects that were noted above include delay, slew, process variation, and voltage waveform. Known models may be used for one or more aspects (e.g., SPICE, transistor level modeling, current source modeling (ECSM), waveform modeling, linear ramp modeling). Creating components of combinations of models, at block 520, refers to parameterizing the different combinations of models. That is, for example, if two models were selected for each aspect of the timing abstract for a given macro 130 (at block 510), then the combination of each of the two models for a given aspect with each of the two models for the other aspects is parameterized at block 520. Generating adaptable timing abstracts, at block 530, refers to associating each combination of models with the set of parameters specific to that combination of models. To be clear, more than one model of the macro 130 may be available, with each model being at a different level of complexity. Thus, further sets of combinations may be obtained for a given macro 130.

Figure 6:
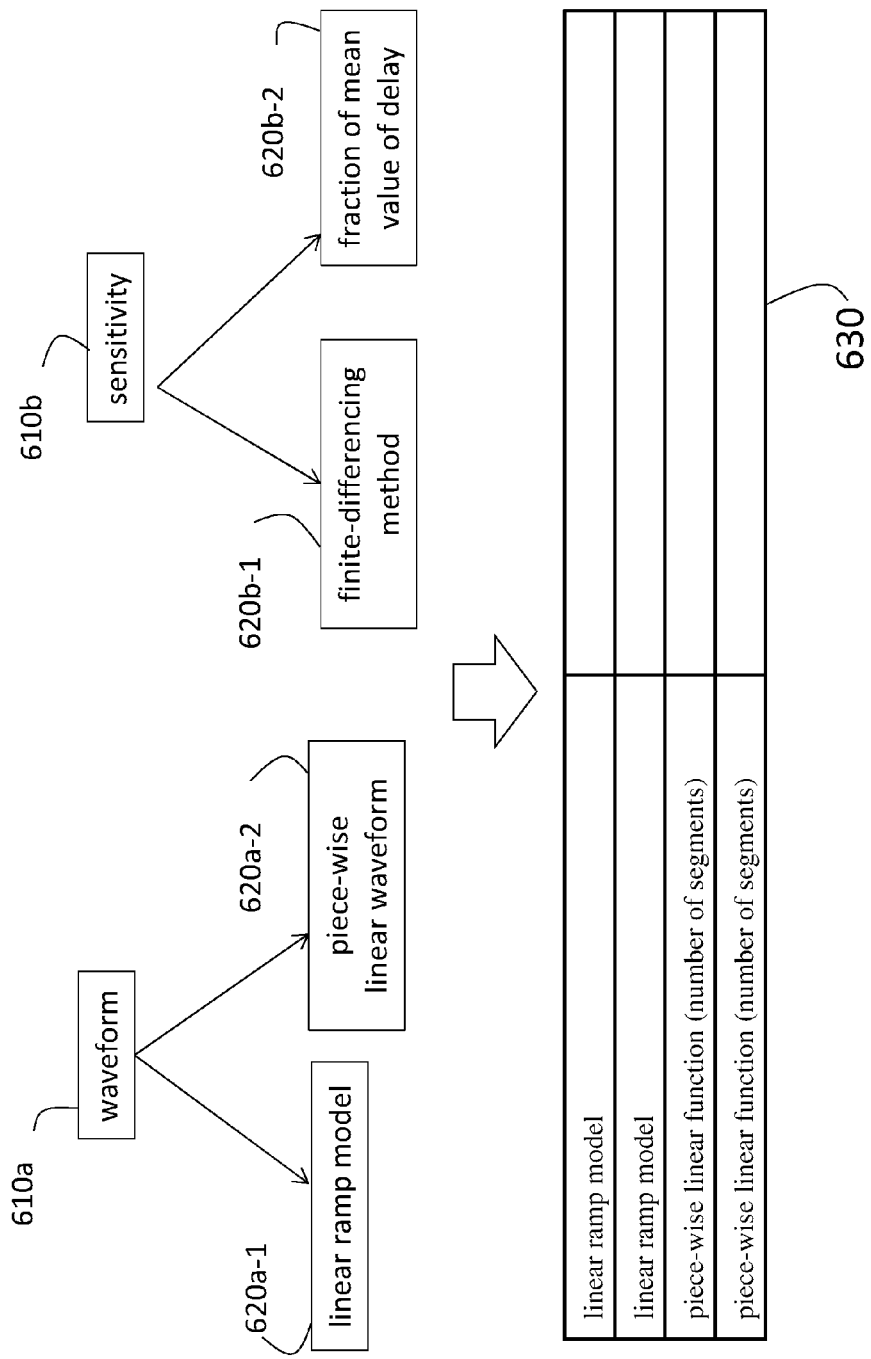
FIG. 6 illustrates the process of creating components of combinations of models to generate adaptable timing abstracts according to an embodiment.

FIG. 6 illustrates the process of creating components of combinations of models (block 520) to generate adaptable timing abstracts (at block 530) according to an embodiment. An exemplary case of two aspects 610 are considered: modeling a waveform 610*a* and computing sensitivities 610*b* of linear canonical forms used for statistical timing. For the aspect associated with modeling the waveform 610*a* (one of the two aspects 610 considered in the example), two models are selected in this example as potential models that may be instantiated: a linear ramp model 620*a*-1 and a piece-wise linear waveform 620*a*-2 with a number of segments N ranging from 2 to 10. For computation of sensitivities 610*b* (the other of the aspects 610 considered in the example), exemplary selected methods include that sensitivities are asserted as a fraction of mean value of delay 620*b*-1 and the finite-differencing method 620*b*-2. The combinations that can result from the exemplary models 620 for the two exemplary aspects 610 are compiled in the table 630 shown in FIG. 6. If waveform model and sensitivity computation method were the only aspects of a timing model (which they are not in reality), then table 630 would represent the entirety of possible specific timing abstracts for the exemplary selected models in FIG. 6. The combinations are parameterized as a combination of the following parameters: "type of waveform model" accepting values "linear ramp" and "piece-wise linear function"; "number of segment" accepting values from 2 to 10 (this parameter is applicable only in combination with "piece-wise linear function" type of waveform); "method of sensitivities computation" accepting values "assertion" and "finite-differencing", and several parameters like "asserted sensitivity of variational parameter X1" specifies fraction (0.01, 0.02, etc.) of mean that is used for computing sensitivity to variation of parameter X1. Here X1 can be any variational parameter of interest like voltage, temperature, or metal thickness, for example. The example above indicates how each of the models for each of the aspects (for a given macro 130) may be parameterized and combined. To be clear, a given specific timing abstract would require the specification of N models relating to N different aspects. Thus, a specific timing abstract may be instantiated (at block 430) as adaptable timing abstract (A, B, . . . , N), where A may be the type of waveform model, B may be the method of sensitivity computation, as discussed above. As discussed above, different selections may be made for different components of the same macro 130, or for different instantiations of the same macro 130 in different parts of the integrated circuit 120 or at different stages of the design.

An instantiation of an adaptable timing abstract, for a given macro 130, is a particular combination of models for each aspect. Referring to the above example, the instantiation may, for example, select a waveform model with 5 linear segments, and an asserted method of computing sensitivities to temperature variation as 0.05 fraction of mean value of delay, and a finite-differencing method of computing sensitivities to supply voltage variations. At block 540, determining the error functions associated with each instantiation of the adaptable timing abstract includes identifying the error value or, in many cases, the error function associated with the model associated with each aspect for each combination of the model. For each instantiation, error functions may be determined for each level of complexity of the model of the macro 130, as well. The error functions include errors due to modeling process and environmental variability, as well as other errors in timing quantities. At block 540, mapping instantiation to error function includes associating each instantiation of the adaptable timing abstract for each macro 130 (parameterized at block 520) with the error functions (determined at block 540). The error functions (or error quantities) associated with each model that is part of a given combination may be added, multiplied, or otherwise processed to determine a total timing error associated with that instantiation. While the discussion has focused on error functions and, thus, accuracy, memory consumption and runtimes associated with each model of a combination may additionally be determined (at block 540) and mapped (at block 550), as well. The additionally computed memory consumption and runtimes associated with each model for each aspect may be used for constructing the instantiation that provides the best trade-off between accuracy (error of modeling) and the required computing resources in terms of memory and runtime.

As noted above, a macro 130 may have multiple timing paths (e.g., two different inputs associated with two different timing paths to the output). Thus, for a given macro 130, the processes discussed above may be repeated for each path. Thus, some models may be considered for one path that are not considered for another.

Figure 7:
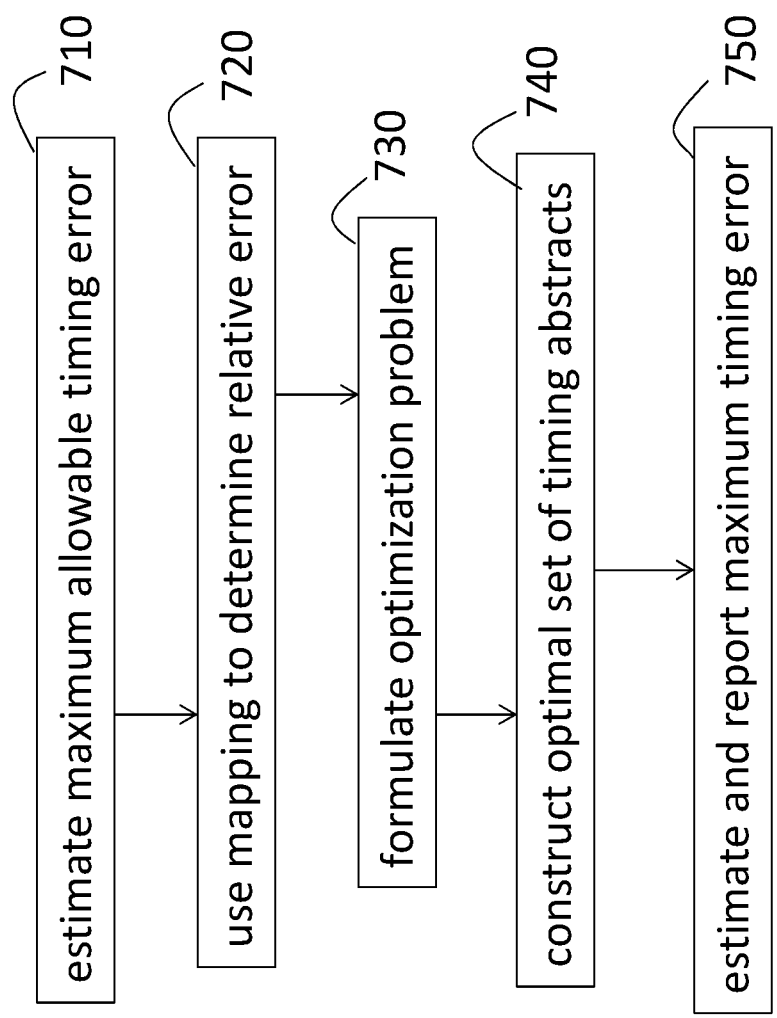
FIG. 7 is a process flow of a method of instantiating a specific timing abstract from an adaptable timing abstract according to embodiments.

FIG. 7 is a process flow of a method of instantiating a specific timing abstract from an adaptable timing abstract according to embodiments. The processes shown in FIG. 7 are included in the processes at blocks 420 and 430 (FIG. 4). At block 710, estimating maximum allowable timing error refers to performing a coarse preliminary analysis to identify critical areas of the integrated circuit 120. This estimate may be based on fast deterministic timing and may use information from the design stage (e.g., known critical areas of the chip), design goals, or designer input. For example, a designer may indicate that, for a given macro 130, voltage variability is more critical than other types of variability (e.g., temperature, process). This information may affect the particular model selected for instantiation of the voltage aspect. At block 720, using the mapping (at block 550) to determine relative (or absolute) error and required memory and runtime is for each specific timing abstract that may be obtained from the adaptable timing abstract for a given macro 130. Choosing the specific instantiation (selecting the specific timing and variability models for tradeoff between accuracy and computing resources (e.g., runtime, memory)), involves the processes at blocks 730 and 740.

At block 730, formulating an optimization problem relates to considering the error associated with each model for each aspect (according to the mapping used at block 720), constraints on the compatibility of different models (e.g., if the sensitivity of a parameter X is asserted, then its cross-term cannot be computed accurately by a finite-differencing model), and expected memory and runtime savings attributed to modeling variability. Constructing an optimal set of timing abstracts (instantiations), at block 740, includes using a branch and bound or greedy method, for example. Selecting a particular combination of models for each of the different aspects does not necessarily apply to every portion of the macro 130. That is, for example, the delay in one particular part of the macro 130 may be more critical than in other parts such that a different delay model is chosen for one part of the macro 130 than for other parts of the macro 130. Estimating and reporting maximum timing error, at block 750, is for end points and propagation paths of the entire integrated circuit 120. That is, the optimal set of instantiated timing abstracts (at block 740) for all macros 130 are considered.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of adaptively characterizing and instantiating a specific timing model to perform timing analysis of an integrated circuit, the method comprising:

generating, using a processor, an adaptable timing model for one or more macro models of a macro, the macro including two or more primitives of a component of the integrated circuit, the adaptable timing model being a parameterized timing model with at least one aspect represented by two or more models;

estimating requirements for the timing analysis, the requirements including accuracy, runtime, or memory requirements;

selecting, using the processor, the specific timing model obtained by setting parameters of the adaptable timing model to perform the timing analysis based on the requirements;

determining an error function associated with each of the aspects of the adaptable timing model for each of the specific timing models obtained from the adaptable timing model, wherein the determining the error functions associated with each of the aspects of the adaptable timing model includes determining the error functions for each path starting at each input of the macro; and using a result of performing the timing analysis to manufacture the integrated circuit.

2. The computer-implemented method according to claim 1, further comprising mapping each of the specific timing models with the error functions associated with the aspects of the specific timing model, wherein the selecting the specific timing model is based on the associated error functions.

3. The computer-implemented method according to claim 2, wherein the selecting the specific timing model includes formulating an optimization problem based on the requirements and constructing an optimal set of specific timing models based on the mapping.

4. The computer-implemented method according to claim 1, wherein the selecting the specific timing model includes making a different selection for each of two different implementations of the macro in the integrated circuit.

5. The computer-implemented method according to claim 1, wherein the selecting the specific timing model includes making a different selection for each of two different portions of the macro.

6. The computer-implemented method according to claim 1, wherein the selecting the specific timing model includes making a different selection at each of two different stages in design of the integrated circuit.

7. A system to adaptively characterize and instantiate a specific timing model to perform timing analysis of an integrated circuit, the system comprising:

a processor configured to generate an adaptable timing model for one or more macro models of a macro, the macro including two or more primitives of a component of the integrated circuit, the adaptable timing model being a parameterized timing model with at least one aspect represented by two or more models, estimate requirements for the timing analysis, the requirements including accuracy, runtime, or memory requirements, and select the specific timing model obtained by setting parameters of the adaptable timing model to perform the timing analysis based on the requirements; and a memory device configured to store the adaptable timing model, wherein the processor determines an error function associated with each of the aspects of the adaptable timing model for each of the specific timing models obtained from the adaptable timing model by determining the error functions for each path starting at each input of the macro, and a result of the timing analysis is used to manufacture the integrated circuit.

8. The system according to claim 7, wherein the processor creates an association between each of the specific timing models and the error functions associated with the aspects of the specific timing model in the memory device, and the processor selects the specific timing model based on the associated error functions.

9. The system according to claim 8, wherein the processor formulates an optimization problem based on the requirements and constructs an optimal set of specific timing models based on the association to select the specific timing model.

10. The system according to claim 7, wherein the processor selects the specific timing model by making a different selection for each of two different implementations of the macro in the integrated circuit, making a different selection for each of two different portions of the macro, or making a different selection at each of two different stages in design of the integrated circuit.

11. A computer program product for adaptively characterizing and instantiating timing models to perform timing analysis of an integrated circuit, the computer program product comprising a computer readable storage medium having program instructions embodied therewith, the program instructions executable by a processor to perform a method comprising:

generating an adaptable timing model for one or more macro models of a macro, the macro including two or more primitives of a component of the integrated circuit, the adaptable timing model being a parameterized timing model with at least one aspect represented by two or more models;

estimating requirements for the timing analysis, the requirements including accuracy, runtime, or memory requirements; and selecting a specific timing model obtained by setting parameters of the adaptable timing model to perform the timing analysis based on the requirements;

determining an error function associated with each of the aspects of the adaptable timing model for each of the specific timing models obtained from the adaptable timing model, wherein the determining the error functions associated with each of the aspects of the adaptable timing model includes determining the error functions for each path starting at each input of the macro and a result of performing the timing analysis is used to manufacture the integrated circuit.

12. The computer program product according to claim 11, further comprising mapping each of the specific timing models with the error functions associated with the aspects of the specific timing model, wherein the selecting the specific timing model is based on the associated error functions.

13. The computer program product according to claim 12, wherein the selecting the specific timing model includes formulating an optimization problem based on the requirements and constructing an optimal set of specific timing models based on the mapping.

14. The computer program product according to claim 11, wherein the selecting the specific timing model includes making a different selection for each of two different implementations of the macro in the integrated circuit, making a different selection for each of two different portions of the macro, or making a different selection at each of two different stages in design of the integrated circuit.

* * * * *